July 27, 1965 V. H. PETERSON 3,197,220
CHUCK APPARATUS
Filed July 10, 1963 3 Sheets-Sheet 1

INVENTOR.
Victor H. Peterson
BY Harold E. Cole
Attorney

July 27, 1965  V. H. PETERSON  3,197,220
CHUCK APPARATUS
Filed July 10, 1963  3 Sheets-Sheet 2
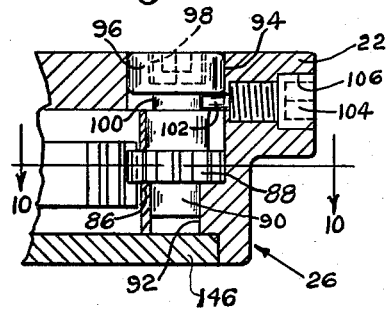
Fig. 3
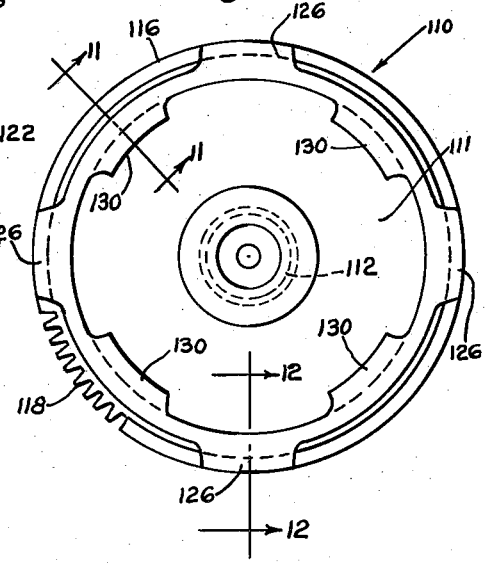
Fig. 4
Fig. 5
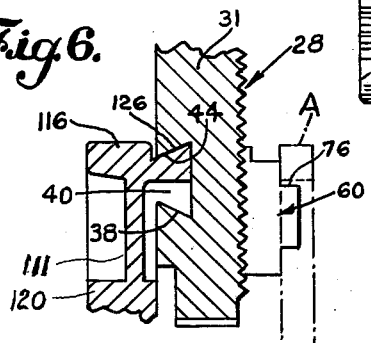
Fig. 6
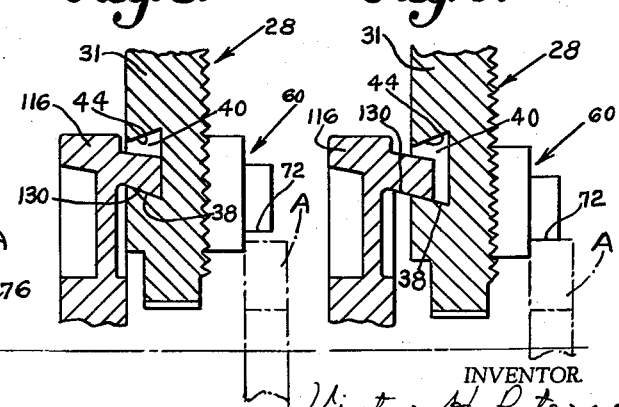
Fig. 8    Fig. 9
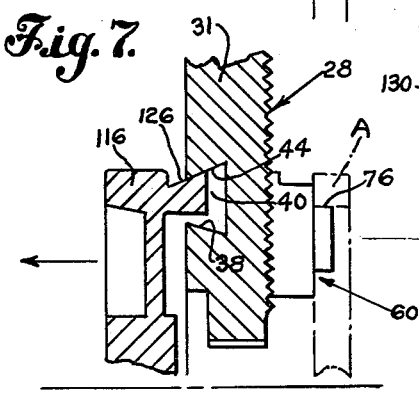
Fig. 7
INVENTOR.
Victor H. Peterson
BY Harold E. Cole
Attorney July 27, 1965 V. H. PETERSON 3,197,220
CHUCK APPARATUS
Filed July 10, 1963 3 Sheets-Sheet 3

INVENTOR.
Victor H. Peterson
BY Harold E. Cole
Attorney

United States Patent Office 3,197,220
Patented July 27, 1965

3,197,220
CHUCK APPARATUS
Victor H. Peterson, Watertown, Mass.
(183 High St., Boston, Mass.)
Filed July 10, 1963, Ser. No. 293,968
9 Claims. (Cl. 279—121)

This invention relates to chuck apparatus.

One object of my invention is to provide chuck apparatus having jaw members carrying work grippers which latter can be released or tightened on the work or article to be worked upon by linear movement of the jaw members effected by a drawbar moving a cam device.

Another object of my invention is to provide such apparatus that has a cam device having both interior and exterior cam surfaces, which device serves, upon linear movement thereof, to tighten work grippers on said article, or release them.

Still another object is to provide such apparatus that requires only one work gripper for each jaw member to hold said article such as a ring, and perform work thereon both internally and externally, and without having to use a wrench.

A further object is to provide such apparatus in which each said jaw member has two cam receiving portions, spaced apart, into which space said portions enter, and upon linear movement of the later said jaw member is moved either away or towards the center, and tightened on the work.

A still further object is to provide such apparatus with a cam device having a gear segment and both external and internal cam surfaces, either of which surfaces may be moved to effective position that enables movement of the jaw members by a relatively slight rotation of a pinion in mesh with said gear segment of said device, and thus prepare my apparatus to hold said article for performing either internal or external work thereon.

And a still further object is to provide such apparatus in which the working parts are so protected or enclosed that they are inaccessible to the entry of chips or other refuse from the article being worked upon.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 3 is a sectional view taken on the line 3—3 of FIG. 1.

FIG. 4 is a side elevational view of my cam device.

FIG. 5 is a front elevational view of my cam device.

FIG. 6 is a fragmentary, sectional view showing a front cam surface of a jaw member rear portion in normal position and in contact with a cam device outer cam surface, ready to grip the interior of an article to be worked upon.

FIG. 7 is a view similar to FIG. 6; but showing the jaw member moved away from the center of my apparatus to tight gripping position on the article to be worked upon, and a cam device outer cam surface moved to a position partly away from said front cam surface.

FIG. 8 is a fragmentary, sectional view showing a rear cam surface of a jaw member front portion in normal position and in contact with a cam device inner cam surface ready to grip the exterior of an article to be worked upon.

FIG. 9 is a view similar to FIG. 8; but showing the jaw member moved towards the center of my apparatus to tight gripping position on the article to be worked upon, and a cam device inner cam surface moved to a position partly away from said jaw member rear cam surface.

Figure 1:
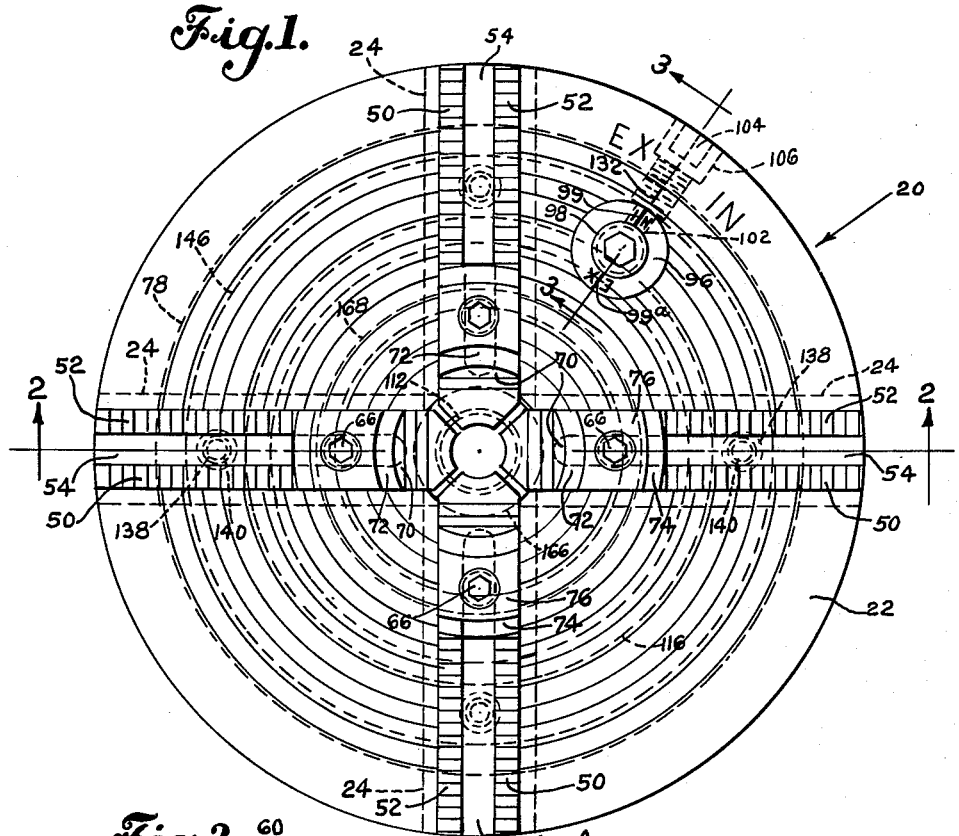
FIG. 1 is a front elevational view of my chuck apparatus.
Figure 2:
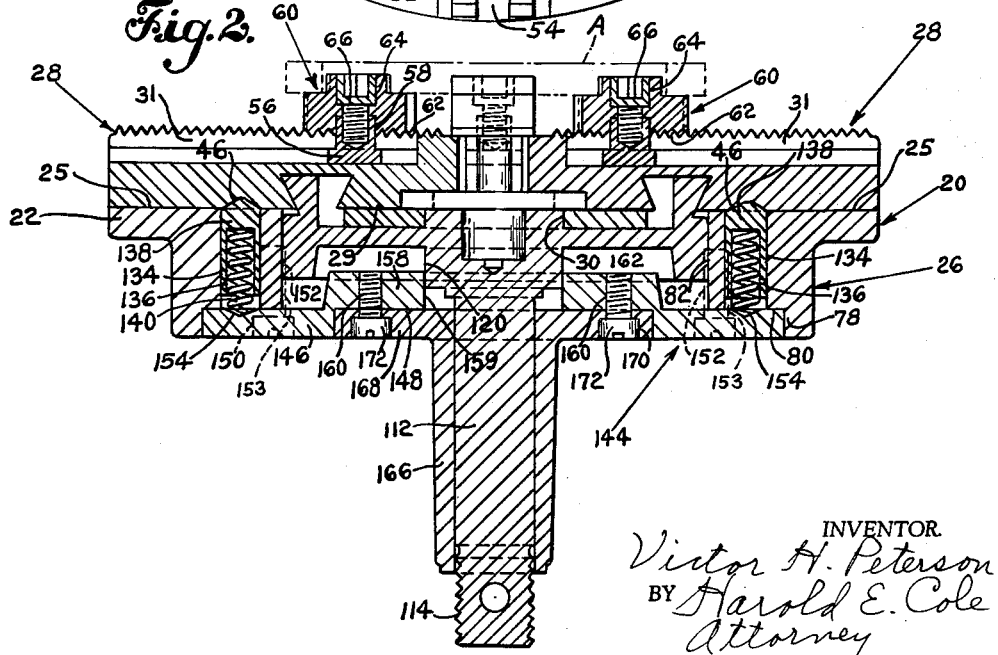
FIG. 2 is a sectional view taken on the line 2—2 of FIG. 1.
Figure 10:
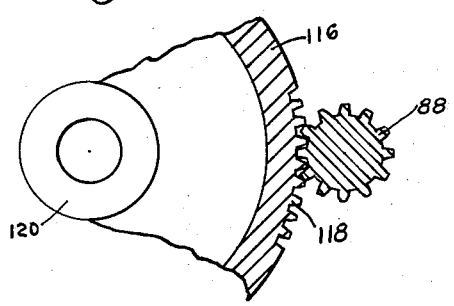
FIG. 10 is a sectional view taken on the line 10—10 of FIG. 3.
Figure 11:
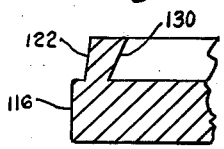
FIG. 11 is a sectional view taken on the line 11—11 of FIG. 5.
Figure 12:
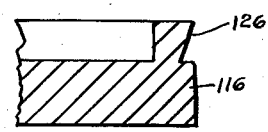
FIG. 12 is a sectional view taken on the line 12—12 of FIG. 5.
Figure 13:
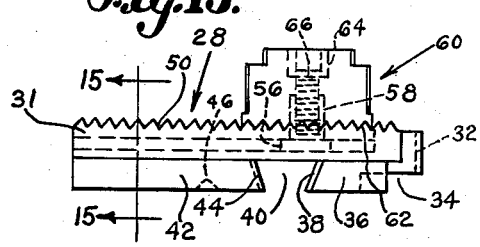
FIG. 13 is a side elevational view of a jaw member carrying a gripper.
Figure 15:
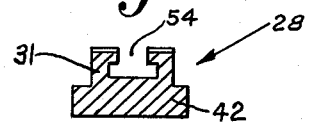
FIG. 15 is a sectional view taken on the line 15—15 of FIG. 13.
Figure 14:
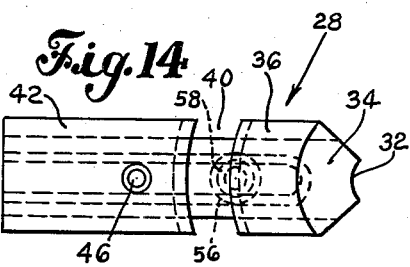
FIG. 14 is a bottom plan view of a jaw member.

As illustrated, my chuck apparatus has a unitary, work-engaging device 20 having a segmented face plate body portion 22 in which T-shaped slots 24 are formed extending from the periphery to a common center, thus providing seats or sliding surfaces 25 later referred to. Rearwardly of and inset from said body portion 22 and of lesser diameter thereof, said device includes an integral collar portion 26, later referred to.

Slidable in said slots 24 are separate jaw members 28 which slide on said exposed surfaces 25 and on the surface of an integral, central bearing support 29 having a hole 30 therethrough. There may be two or more slots 24 and jaw members 28 depending upon working needs. Each jaw member 28 has a main body 31 the front end 32 of which is concaved and the front bottom portion is undercut as at 34 for easier entry into a said slot. Said jaw body 31 has a front cam-receiving position 36 having a rear sliding cam surface 38 which provides a convex curve, being beveled and flaring outwardly.

Spaced as at 40 from said front cam receiving portion 36 is a rear cam-receiving portion 42 having a front sliding cam surface 44 in the form of a concave curve, being beveled and flaring outwardly. Said cam-receiving portion 42 has a positioning indent 46 therein extending inwardly from its sliding surface, later referred to. Said body 31 has two rows 50 and 52 of exterior teeth which are spaced apart as at 54 to slidably receive the sliding portion 56 of a slide that has an interiorly threaded tube portion 58.

Carried by said jaw body 31 is a work gripper 60 having teeth 62 at its inner surface that will mesh with said teeth 50 and 52. A countersunk hole 64 extends through said gripper 60 to receive an Allen locking screw 66 that screw-threadedly connects with said tube portion 58 to thereby firmly hold said work gripper 60 to said main body 31 in whatever position is chosen to grip the work on an article A being worked upon.

Said gripper 60 has at one end a front and lower concave gripping surface 70 and spaced outwardly therefrom in stepped arrangement is an upper concave gripping surface 72. At the opposite end it has a rear and lower convex gripping surface 74 and above and spaced inwardly therefrom, in stepped arrangement, is another convex gripping surface 76.

Said collar portion 26 has an outer rim 78 and recessed therein is a circular connector portion 80, having a large hole 82 therein. Extending in a peripheral direction from the interior of said collar portion 26 is a cut-out 86 into which a pinion 88 rotatably extends with a few of its teeth extending beyond the inner surface of said collar portion 26. An end of a shaft 90 of said pinion is rotatably set in a hole 92 in said collar portion 26 which hole is in alinement with a larger diameter hole 94 in said face plate body portion 22.

Said shaft has a positioning member 96, which has a hexagon socket opening 98, and which rotatably extends into said larger hole 94. It is marked at its exterior with indicia IN having a positioning line 99 between the two letters, and with other indicia EX having a positioning line 99a between the letters. Intermediate said positioning member 96 and said pinion 88 is a reduced or recessed shaft portion 100 into which a reduced end 102 of a locking screw 104 enters to bear against said shaft portion 100 and tightly hold said pinion 88 in predetermined position. This screw 104 extends into a countersunk hole 106 in the side of said face plate body 22 and which latter is screw-threaded to receive said screw 104.

A cam device 110 has a main body 111 and a central shaft 112 extending from the latter by which the desired linear movement of said cam device is effected. Said shaft 112 is screw-threaded as at 114 to connect with any well known actuating member such as a drawbar not shown. Said cam device 110 has an outer, circular rim portion 116 in which a gear segment 118 is provided that is adapted to mesh with the teeth of said pinion 88. Movement of the latter, when so meshed, rotates said cam device 110 the desired distance, as later explained. Said shaft has a widened bearing portion 120, later referred to.

Beyond said outer rim 116 and at an extremity of said cam device 110 a cam rim portion 122 is formed on which are projecting exterior cam surfaces 126 spaced apart, there being one for each said jaw member 28. Said exterior cam surfaces 126 flare peripherally outward from said outer rim 116 whereby they will slide on said cam receiving concave surfaces 44 if the article or work A being held, such as a hollow ring, is to be worked upon interiorly. Drawing or linear movement of said cam device 110 will move said jaw members 28 outwardly in a direction away from the center of my device 20 thus tightening the grip of said jaw members 28 on the interior surface of the work or article A being held by my device.

Said cam rim portion 122 also has projecting interior cam surfaces 130 which flare peripherally inward in a direction away from cam outer rim 116. These cam surfaces 130 are spaced peripherally from said cam surfaces 126 being inwardly of and intermediate two of the latter surfaces. Thus the cam surfaces 38 and 44 of said jaw members are either opposite said cam surfaces 130 or said cam surfaces 126 respectively.

To position my apparatus so that the article being held is to be worked upon exteriorly, as at the outer peripheral surface thereof, said screw reduced end 102 is drawn out of said recess 100 and said positioning member 96, with said shaft 90, is rotated in a direction towards the indicia EX on said face plate portion 22 until the locating line 99a between the E and X is opposite a locating line 132 on said face plate body 22 adjacent said hole 94. This movement rotates said cam device 110 since said cam segment gear 118 and the pinion teeth 88 are in mesh. It brings said exterior cam surfaces 126 in the space 40 between said jaw member cam surfaces 38 and 44, and thus said exterior cam surfaces 126 can slide on said cam receiving rear surfaces 44. Drawing movement of said cam device 110 will draw said jaw members 28 outwardly away from the center of said face plate body 22 thus tightening the grip of said gripers 60 on the interior surface of the article A. In so working on its outer surface, the article A will be internally gripped or contacted by a said gripper rear surface 74 or 76.

To position my device so that the article, such as a ring being held, is worked upon interiorly, as at the inner peripheral surface thereof, said screw reduced end 102 is drawn out of recess 100 and said positioning member 96 is rotated in a direction towards the indicia IN on said face plate portion until the locating line 99 between the I and N is oposite the locating line 132. This movement will bring said interior cam surfaces 130 in said space 40 and thus said latter cam surfaces can slide on said cam receiving rear surfaces 38. Drawing movement of said cam device 110 will draw said jaw members 28 inwardly towards the center thus tightening the grip of the grippers 60 on the exterior surface of article A. In so working on its inner surface the article A will be exteriorly gripped or contacted by a said gripper front surface 70 or 72.

Holes 134 commence at said jaw member sliding surfaces 25 and extends through said collar portion 26. In each hole 134 a compressible member movably extends having a thimble 136 with conical, closed end 138 which normally projects beyond said surfaces 25 and enters a said jaw member indent 46. Also a coil spring 140 extends into each said thimble 136 and normally projects beyond, as later explained.

A retainer member 144 has an outer circular portion 146 having a large central recess 148, and four countersunk holes 150 therethrough adjacent the periphery thereof. Screws 152 extend through said holes 150 and screw-threadedly connect with screw-threaded holes 153 in said collar connecting portion 80. Said retainer outer portion 146 has indentations 154 therein that receive the ends of said coil springs 140.

Said retainer member 144 also has an interior, circular, projecting portion 158 commencing at said recess 148 and extending beyond and having a central hole 159 therethrough, and also four screw-threaded holes 160 therethrough. Said interior projecting portion 158 enters a recess 162 between said cam outer rim 116 and said cam shaft widened portion 120. The latter enters said hole 159 which provides a bearing surface and is movable therein rotatably and laterally.

A sleeve bearing 166 for said cam shaft 112 has a plate portion 168 at one end that enters said retainer member central recess 148 and has four countersunk holes 170 therethrough. Screws 172 extend into said holes 170 and screw-threadedly connect with said holes 160.

Some linear movement between said cam outer rim 116 and said retainer projecting portion 158 occurs when said jaw members 28 are tightened on an article being worked upon, or released.

Said thimbles 136 and coil springs 140 extend from said jaw member indents 46 through said collar portion holes 134 and into said retainer outer portion indents 154. Since said springs are under compression, the positions of said jaw members are thereby maintained in said slots 24.

When said cam device 110 is moved by a drawing movement of said cam shaft 112 said thimble conical ends 138 are forced out of said jaw member indents 46, said coil springs 140 being further compressed in this movement. This permits some movement of said jaw members 28 in said slots 24 to thus tighten the work grippers 60 on the work. A.

In operation, said jaw members 28 are normally in predetermined position in said slots 24 with said thimble ends 138 extending into said jaw member indents 46. Said work grippers 60 are moved to whatever positions on said jaw members are desirable to hold the work.

Said screw 104 is loosened to permit movement of said gear segment 118 to thereby rotate said cam device 110 to a position where either said interior cam surfaces 130, or said exterior cam surfaces 126 are in the spaces 40 between said cam receiving portions 36 and 42.

Then said locking screw 104 is tightened and said cam device is drawn outward by a pull or linear movement on said cam shaft 112. This forces said jaw members 28 with grippers 60 either forwardly or rearwardly in said slots 24, depending upon the positions of said cam surfaces 126 and 130, to firmly hold the article A ready to be worked upon.

What I claim is:

1. Chuck apparatus comprising a work-engaging device embodying a face plate portion having a collar portion having an opening therein, said face plate portion having slots therein extending from the periphery inwardly, jaw members slidable in said slots embodying a front cam receiving portion having a rear convex sliding cam surface and embodying a rear cam receiving portion spaced from said front cam receiving portion and having a front concave sliding cam surface, work grippers carried by said jaw members having concave and convex gripping surfaces at opposite ends thereof, a cam device embodying a main body, an outer rim portion adapted to slidably extend into said collar portion opening, a cam rim portion having a group of outer cam surfaces spaced apart and a group of inner cam surfaces spaced apart and spaced peripherally from said outer cam surfaces, both said outer cam surfaces and said inner cam surfaces being adapted to enter the spaces between said jaw member cam receiving front and rear portions, one group at a time, and slide on said jaw member sliding surfaces, and a shaft by which said cam device is movable in said collar portion opening to thereby cause said jaw members to slide in said slots as said cam surfaces slide on said jaw member sliding surfaces, and means to movably retain said cam outer rim in position extending into said collar member opening.

2. Chuck apparatus comprising a work-engaging device embodying a face plate portion having a collar portion having an opening therein, said face plate portion having slots therein, jaw members slidable in said slots embodying front cam receiving portions having rear convex sliding cam surfaces and embodying a rear cam receiving portion spaced from said front cam receiving portion and having a front concave sliding cam surface, work grippers carried by said jaw members having concave and convex gripping surfaces, a cam device embodying a main body adapted to slidably extend into said collar opening and a cam rim portion having a group of outer cam surfaces spaced apart and flaring peripherally outward, and a group of inner cam surfaces spaced apart and flaring peripherally inward, both said groups being adapted to enter the spaces between said jaw member cam receiving front and rear portions and slide on said jaw member sliding cam surfaces, one group at a time, said cam device embodying a shaft by which said cam device is movable with relation to said collar portion to thereby cause said jaw members to slide in said slots as said cam rim cam surfaces slide on said jaw member sliding surfaces, and means connected to said work-engaging device to movably retain said cam device body in said collar member opening.

3. Chuck apparatus comprising a work-engaging device embodying a face plate portion having a collar portion having an opening therein, said face plate portion having slots therein extending from said periphery inwardly, jaw members slidable in said slots embodying a front cam receiving portion having a rear sliding cam surface and embodying a rear cam receiving portion spaced from said front cam receiving portion and having a front sliding cam surface, work grippers carried by said jaw members, said work-engaging device having a first hole extending from said face plate portion inwardly and a cut-out communicating with said first hole and said collar portion opening, a pinion extending into said cut-out and embodying teeth extending into said collar portion opening and a shaft extending into said first hole by which said pinion may be rotated, a cam device embodying a main body, an outer rim portion adapted to slidably extend into said collar portion opening having a gear segment that has teeth in engagement with said pinion teeth whereby said cam device may be rotated, a cam rim portion having a group of outer cam surfaces spaced apart and a group of inner cam surfaces spaced apart and spaced peripherally from said outer cam surfaces, both said outer cam surfaces and said inner cam surfaces being adapted to enter the spaces between said jaw member cam receiving front and rear portions one group at a time and slide on said jaw member sliding cam surfaces, and a shaft by which said cam device is movable in said collar portion opening to thereby cause said jaw members to slide in said slots as said cam surfaces slide on said jaw member sliding surfaces, and means connected to said work-engaging device to movably retain said cam rim portion in said collar member opening.

4. Chuck apparatus as set forth in claim 3 in which said work-engaging device has another hole extending from the periphery inwardly and communicating with said first hole, and a locking member extends into said other hole and is adapted to engage said pinion shaft to prevent rotation thereof.

5. Chuck apparatus as set forth in claim 4 in which said pinion shaft has a recess therein intermediate the ends thereof and said locking member extends into said shaft recess.

6. Chuck apparatus comprising a work-engaging device embodying a face plate portion having a collar portion having an opening therein, said face plate portion having slots therein, jaw members slidable in said slots embodying front cam receiving portions having rear convex sliding cam surfaces and embodying a rear cam receiving portion spaced from said front cam receiving portion and having a front concave sliding cam surface, said jaw members having indents therein at the bottom surface thereof, work grippers carried by said jaw members having gripping surfaces, a cam device embodying a main body adapted to slidably extend into said collar opening and a cam rim portion having a group of outer cam surfaces spaced apart and a group of inner cam surfaces spaced apart and spaced peripherally from said outer cam surfaces, both said outer cam surfaces and said inner cam surfaces being adapted to enter the spaces between said jaw member cam receiving front and rear portions one group at a time and slide on said sliding cam surfaces, said cam device embodying a shaft by which said cam device is movable linearly with relation to said collar portion to thereby cause said jaw members to slide in said slots as said cam surfaces slide on said jaw member sliding surfaces, and means connected to said device to movably retain said cam body in said collar member opening embodying a retainer member having indents therein, said work-engaging device having holes therethrough in alinement with said jaw member indents and said retainer member indents, compressible members extending through said latter holes and into both said indents and normally being under compression whereby said jaw members are normally maintained in predetermined positions in said slots, but upon linear movement of said cam device body said compressible members are movable out of said jaw member indents to thereby permit said sliding movement of said jaw members.

7. Chuck apparatus as set forth in claim 6 in which said compressible members embody thimbles one of the ends of which extends into said jaw member indents, and compression springs extending into said thimbles and projecting beyond, one of the ends of which extends into said retainer member indents, and are normally under compression.

8. Chuck apparatus comprising a work-engaging device embodying a face plate portion having a collar portion, said face plate portion having slots therein, jaw members slidable in said slots embodying a front cam receiving portion having a rear sliding cam surface and embodying a rear cam receiving portion spaced from said front cam receiving portion and having a front sliding cam surface, work grippers carried by said jaw members, and a cam device embodying a main body and an outer rim portion adapted to slidably extend into said collar portion, a cam rim portion having a group of outer cam surfaces spaced apart and a group of inner cam surfaces spaced apart and spaced peripherally from said outer cam surfaces, both said outer cam surfaces and said inner cam surfaces being adapted to enter the spaces between said jaw member cam receiving front and rear portions, one group at a time and slide on said jaw member sliding surfaces.

9. Chuck apparatus comprising a work-engaging device embodying a face plate portion having a collar portion having an opening therein, said face plate portion having slots therein, jaw members slidable in said slots embodying a front cam receiving portion having a rear convex sliding cam surface and embodying a rear cam receiving portion spaced from said front cam receiving portion and having a front concave sliding cam surface, work grippers carried by said jaw members each having concave and convex gripping surfaces at opposite ends thereof, a cam device embodying a main body, an outer rim portion adapted to slidably extend into said collar portion opening, a cam rim portion having cam surfaces adapted to enter the spaces between said jaw member cam receiving front and rear portions and slide on said sliding cam surfaces, and means by which said cam device may be moved in said collar portion opening to thereby cause said jaw members to slide in said slots as said cam surfaces slide on said jaw member sliding surfaces, and a retainer member connected to said work-engaging device to movably retain said cam outer rim portion extending into said collar member opening, said cam device having a recess therein radially inward of said outer rim, said retainer member embodying a projecting portion adapted to enter said cam device recess, said cam device being in slidable engagement with said projecting portion, and means connecting said retainer member to said work-engaging device.

References Cited by the Examiner
UNITED STATES PATENTS

| | | | |
|---|---|---|---|
| 1,181,844 | 5/16 | Church | 279—121 |
| 2,602,673 | 7/52 | Deuring | 279—121 |
| 2,722,427 | 11/55 | Labeyrie | 279—119 |
| 2,867,443 | 1/59 | Swanson | 279—119 |
| 2,954,983 | 10/60 | Roby | 279—121 |

FOREIGN PATENTS 344,887   4/60   Switzerland.

ROBERT C. RIORDON, *Primary Examiner.*